Aug. 6, 1940.  G. W. CONNORS, JR  2,210,026
STEEL FABRICATED STRUCTURAL MEMBER
Filed June 24, 1938
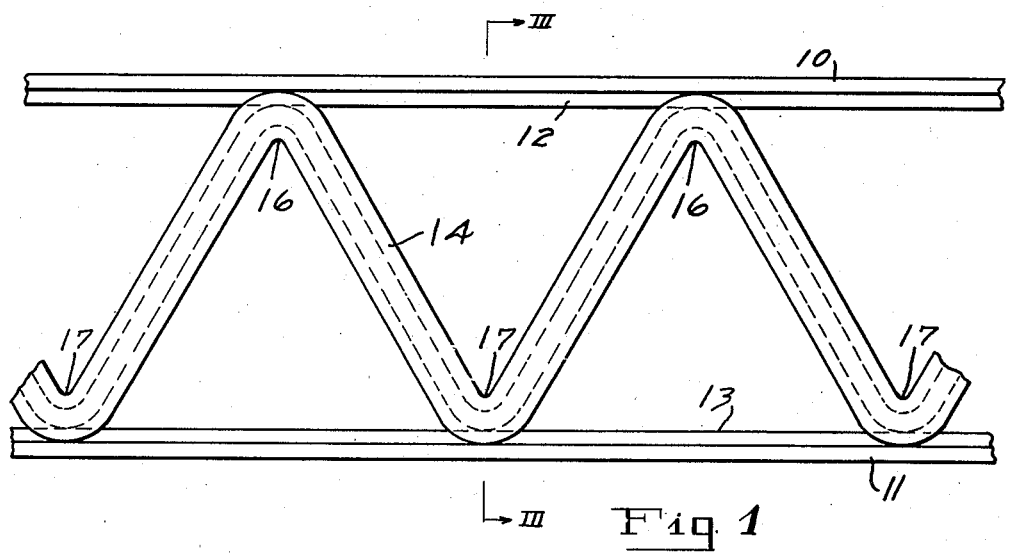
Fig. 1
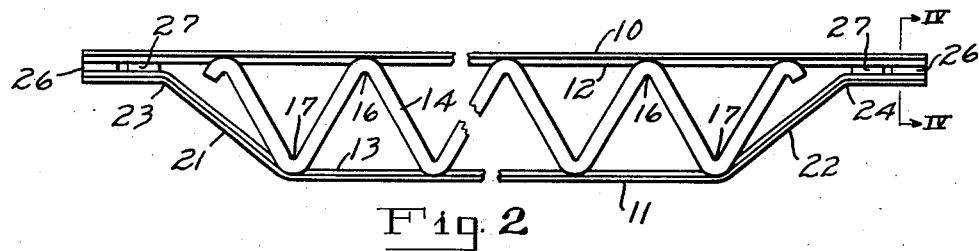
Fig. 2
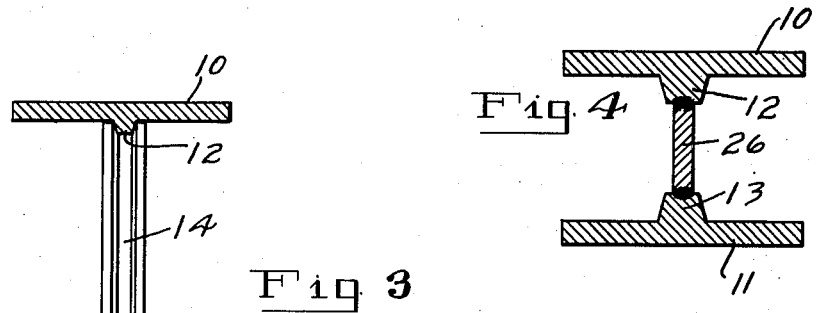
Fig. 3   Fig. 4
Inventor
GEORGE W. CONNORS, Jr.
By 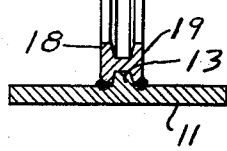
Attorneys Patented Aug. 6, 1940

2,210,026

UNITED STATES PATENT OFFICE 2,210,026

STEEL FABRICATED STRUCTURAL MEMBER

George W. Connors, Jr., Birmingham, Ala., assignor to Connors Steel Company, a corporation of Delaware Application June 24, 1938, Serial No. 215,579

2 Claims. (Cl. 189—37)

My invention relates to a steel fabricated structural member and to a method of making the same, and has for an object the provision of such a member which shall be strong, light in weight, and economical of manufacture.

A further object of my invention is to provide a steel fabricated joist or structural member of similar character which shall embody elements rolled to a shape adapting them to interfit in such a manner as to be readily welded by resistance electric welding.

A still further object of my invention is to provide a method of fabricating a steel joist, truss or like structural member, which shall be simple and economical, and one which may be carried out economically with semi-skilled labor.

Fabricated steel joists, trusses, and similar structural members, are well known. They usually embody spaced chord members joined together by diagonally disposed lattice members, either by riveting or bolting together, or by welding. Where bolted together the accurate drilling of holes in the chord and lattice members, as well as the labor of bolting or riveting the members together, entails considerable skilled labor. Electric arc welding also requires the services of an expert welder to carry out the work. Resistance welding has been employed to some extent, but the welding has been difficult and the shapes employed provided an area of contact so small that the strength of the welds thus produced was not as much as desired.

In accordance with my invention, I have provided a structural steel member of the character above described which embodies a continuous lattice member bent alternately to engage the opposed chord members, and I construct the member of elements rolled to such a shape that they provide a wide contact area without being deformed and are especially adapted for resistance electric welding, which can be carried out by semi-skilled labor. I thus produce a structural member which is extremely sturdy, light in weight, and one which is very economical of manufacture.

A structural member embodying features of my invention is illustrated in the accompanying drawing forming a part of this application, in which Fig. 1 is a view in elevation of a fragment of a structural member embodying opposed chord elements and a unitary lattice element;

Fig. 2 is a view showing my improved construction as applied to a joist or truss;

Fig. 3 is a sectional view taken along the line III—III of Fig. 1; and

Fig. 4 is a sectional view taken along the line IV—IV of Fig. 2.

Referring to the drawing for a better understanding of my invention, I show in Fig. 1 a fragment of a fabricated structural steel member comprising spaced chord elements 10 and 11 of T-section, having opposed webs 12 and 13 which are tapering in cross section, diminishing in width inwardly of the structural member. Joining the chord elements 10 and 11 is a continuous lattice element 14 which is bent as at 16 and 17 so as to engage alternately and extend diagonally to join the chord members 10 and 11 in spaced relation. The lattice member 14, as seen in Fig. 3, is of I-section, and its flanges 18 and 19 are rolled to diverge so as to fit snugly astride the webs 12 and 13. This construction adapts the lattice member to be joined by its flanges and its web to the sides and edges of the chord members by resistance welding, the pressure exerted in the welding operation being such as to hold all three surfaces in engagement until firmly joined together.

In Fig. 2, I show my improved construction as applied to a joist or truss. The upper and lower chord members 10 and 11 are the same as described in connection with Fig. 1. In adapting the construction to a joist, however, the lower chord member 11 is bent upwardly at 21 and 22 to approach the upper chord member 10 at the ends and is there, near the ends, bent at 23 and 24 to lie parallel to the upper chord member, the T-section readily lending itself to the bending operation. Interposed between the parallel ends of the chord members 10 and 11 are filler blocks 26 and 27 at each end of the joist, which may also be joined to the opposed webs 12 and 13 by resistance welding.

My improved structural member is especially adapted for economical methods of manufacture. The chord members 10 and 11, and the lattice member 14, are rolled to the shapes shown. The lattice member 14 may be bent in dies by semi-skilled labor. The resistance electric welding of the lattice members and chord members, as is well understood, is carried out with a machine designed for that purpose in a very rapid manner, also by semi-skilled labor. Also, as is well understood in resistance welding, the elements are pressed together during the welding operation. By employing an I-section with diverging flanges complemental to the converging sides of the webs, I insure welding contact between the web and flanges of the I-section and the sloping sides and the edge of the web of the chord elements. This provides a weld of the greatest possible strength.

While I have shown my invention as especially adapted to the fabrication of joists and trusses, it will be apparent that it is equally adapted for various steel fabricated structural members, such as beams, posts, and the like, the essential features of the invention being the provision of the shapes rolled to interfit and adapt them for pressure, resistance welding.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. A fabricated truss or joist comprising upper and lower chord elements of T-section having opposed webs, said webs narrowing in cross section inwardly of the joist and terminating substantially in flat surfaces normal to the webs, a unitary lattice element of I-cross section with diverging flanges complemental to the sides of the webs of the chord and bent at intervals to extend diagonally between the chord members and for the flanges to sit astride of and be welded alternately to the sides of the webs of the upper and lower chord elements, and for the web of the lattice member to bear against and be welded to the flat surfaces of the webs of the chord elements.

2. A fabricated truss or joist comprising upper and lower chord elements of T-section having opposed webs, said webs narrowing in cross section inwardly of the joist and terminating in substantially flat surfaces normal to the webs, a unitary lattice element of I-cross section with diverging flanges complemental to the webs of the chords and bent at intervals to extend diagonally between the chord elements and for the flanges to sit astride of and be welded alternately to the webs of the upper and lower chord elements and for the web of the lattice member to bear against and be welded to the flat surfaces of the webs of the chord elements, the ends of the lower chord element being bent upwardly to approach the upper chord element, and filler blocks disposed between and engaged to the ends of the upper and lower chord elements.

GEORGE W. CONNORS, Jr.